United States Patent [19]

Guerrina

[11] Patent Number: 5,679,271
[45] Date of Patent: Oct. 21, 1997

[54] APPARATUS AND METHOD FOR PRECISELY ALIGNING AND TACK WELDING TWO PIECES OF WELDABLE MATERIAL

[76] Inventor: Michael Guerrina, 2204 Bahama Rd., Austin, Tex. 78733

[21] Appl. No.: 318,385

[22] Filed: Oct. 5, 1994

[51] Int. Cl.⁶ ..................................................... B23K 9/12
[52] U.S. Cl. ........................ 219/60 A; 219/61; 219/125.11
[58] Field of Search ............................. 219/60 A, 125.11, 219/61

[56] References Cited

U.S. PATENT DOCUMENTS

| | | | |
|---|---|---|---|
| 3,194,936 | 7/1965 | Rohrberg et al. | 219/60 A |
| 3,350,534 | 10/1967 | Libby | 219/125.11 |
| 3,636,294 | 1/1972 | Peyrot | 219/60 A |
| 3,688,072 | 8/1972 | Witt | 219/60 A |
| 3,870,849 | 3/1975 | Rygiol | 219/60 A |
| 5,288,963 | 2/1994 | Jusionis | 219/60 A |

Primary Examiner—Clifford C. Shaw
Attorney, Agent, or Firm—Steven D. Smit

[57] ABSTRACT

Applicant's invention includes an apparatus and associated method for precisely aligning two pieces of weldable material and tack welding the two pieces together. The apparatus contains means for independently securing the two pieces of weldable material and for centering the junction of the two pieces in line with the tack welding electrodes.

16 Claims, 11 Drawing Sheets

APPARATUS AND METHOD FOR PRECISELY ALIGNING AND TACK WELDING TWO PIECES OF WELDABLE MATERIAL

BACKGROUND OF THE INVENTION

1. Field of the Invention

Applicant's invention relates to the joining together of two pieces of material by welding.

2. Background Information

Welding is a well known and widely used method used to permanently join together two pieces of metal tubing or other weldable material. To accomplish a weld of high integrity, the two pieces to be joined together must be properly aligned. Misalignment during welding creates discontinuities at the junction of the two pieces of weldable material that can serve as havens for particle impurities. The existence of these particle "sites" is intolerable when the welding is being performed in connection with ultra-pure applications such as are common in the semiconductor industry. Moreover, misalignment can result in a leaky junction that destroys the purity of the substance flowing through the tubing and creates a potentially dangerous external environment if the substance flowing through the tubing is toxic. Thus, it is highly desirable to minimize tube misalignment when welding.

Maintaining proper alignment during the conventional welding process, however, is a time-consuming and difficult task, because the pieces of weldable material to be aligned and welded must be clamped tightly in alignment as the welding process is undertaken or the pieces will tend to slip out of alignment, before the weld is completed.

This slippage problem is not solved by conventional orbital weld heads. In an orbital welding machine, a computer controlled welding machine works in conjunction with a weld head that holds the two pieces of weldable material together during the welding process. The weld head essentially comprises a system of gears and an electrode for making the weld. The gears control the movement of the electrode as it "orbits" around the circumference of the weldable material. Orbital welding is in great demand, especially for welding of tubing of smaller circumference, because of the ease in which the welding process can be controlled, but orbital welding does not solve the problem of misalignment.

To the contrary, the conventional weld head on a standard orbital welder has such little clamping surface area that proper alignment is often the most significant and time-consuming challenge facing the technician operating the welder. For example, welding is often performed on weldable material pieces that are many feet in length and that may have hardware permanently attached thereto. Because the weld head is affixed to a table or bench, the technician is sometimes required to place one end of a weldable material piece upon support blocks so that the weight of the weldable material and any attached hardware does not drag the weldable material out of alignment.

In addition, the technician has an extremely limited view as she attempts to align the two pieces of weldable material to each other, because of the construction of the orbital weld heads. To aid in the alignment procedure, the technician may find it necessary to use a "feeler" gauge such as a small screwdriver. When the feeler gauge is moved over the top or side of the tube joint, the welder can determine which of the two pieces of weldable material needs to be moved to improve the alignment. Even after achieving alignment of the tube pieces to be welded together, the technician is then required to visually align the tube joint to be welded with the electrode, to ensure a proper weld. This crude technique is not sufficient for applications requiring strict alignment and is very time-consuming.

Even if the alignment is satisfactory at the start of the conventional orbital welding process, the weldable material pieces will tend to separate during the welding process because the hot spots created by the rotating electrode will expand and create a twisting effect as the electrode continues to rotate about the weldable material. An attempt to excessively tighten the clamps to overcome this problem usually results in the formation of clamping marks in the weldable material and may result in actual tube deformation.

In attempt to solve this problem, skilled welders commonly align the two pieces of weldable material and make several temporary spot-welds or "tack" welds around the circumference of the junction between the two weldable material pieces prior to final welding. Tack welds join the two pieces of weldable material together and are sufficiently strong to prevent the separation and twisting effect described above. During final welding, the tack welds merely are re-melted into the final weld. Even when using tack welding, proper alignment is critical, and, therefore tack welding, by itself, does not address the problem of creating acceptable alignment in a time efficient manner. In other words, while tack welding effectively joins two pieces together prior to performing an orbital weld and makes the orbital welding process much simpler, throughput or productivity, measured in welds per hour, is still limited by the amount of time it takes to align the pieces in preparation for the tack weld.

In summary, procedures for achieving and maintaining proper tube alignment during welding have not kept pace with advancements made in the welding process itself. For example, the growing need for ultra clean gas systems in the semiconductor industry has resulted in an increased demand for strictly controlled welding tolerances and placed heightened emphasis on welding throughput. The present invention, by mechanizing the aligning task, greatly reduces the time required to achieve tolerable alignment and, by performing a simultaneous tack welding operation, eliminates the separation, twisting, and clamp mark problems associated with the orbital welder.

SUMMARY OF INVENTION

It is an objective of this invention to provide a device and method of operation for said device for aligning two pieces of weldable material that are to be joined together by welding.

It is a further objective of this invention to provide a device and method of operation for said device, for aligning two pieces of weldable material that are to be joined together by welding and for simultaneously tack welding the two pieces of weldable material together.

It is a further object of this invention to provide a device and method of operation for said device, for aligning two pieces of weldable material that are to be joined together by welding and for simultaneously tack welding the two pieces of weldable material together, that will dramatically decrease the time required to align and tack weld two pieces of weldable material.

It is a further object of this invention to provide a device and method of operation for said device, for aligning two pieces of weldable material that are to be joined together by welding and for simultaneously tack welding the two pieces of weldable material together, that will dramatically decrease the time required to align and tack weld two pieces of weldable material, and that will insure that said pieces of weldable material do not separate or twist during an orbital welding process.

It is a further object of this invention to provide a device and method of operation for said device, for aligning two pieces of weldable material that are to be joined together by welding and for simultaneously tack welding the two pieces of weldable material together, that will dramatically decrease the time required to align and tack weld two pieces of weldable material, that will insure that said pieces of weldable material do not separate or twist during an orbital welding process and that will eliminate the need to excessively tighten the clamps on an orbital weld head, thereby reducing the occurrence of clamping marks on the weldable material.

It is a further object of this invention to provide a device and method of operation for said device, for aligning two pieces of weldable material which are to be joined together by welding and for simultaneously tack welding the two pieces of weldable material together, that will dramatically decrease the time required to align and tack weld two pieces of weldable material, that will insure that said pieces of weldable material do not separate or twist during an orbital welding process, that will eliminate the need to excessively tighten the clamps on an orbital weld head, thereby reducing the occurrence of clamping marks on the weldable material and that will eliminate the need to use a feeler gauge to manually align said pieces of weldable material to each other prior to the performing of the orbital welding operation.

It is a further object of this invention to provide a device and method of operation for said device, for aligning two pieces of weldable material which are to be joined together by welding and for simultaneously tack welding the two pieces of weldable material together, that will dramatically decrease the time required to align and tack weld two pieces of weldable material, that will ensure that said pieces of weldable material do not separate or twist during an orbital welding process, that will eliminate the need to excessively tighten the clamps on an orbital weld head, thereby reducing the occurrence of clamping marks on the weldable material, that will eliminate the need to use a feeler gauge to manually align said pieces of weldable material to each other prior to the performing of the orbital welding operation and that will mechanically align the junction of the weldable material pieces with the electrode performing the tack weld.

It is a further object of this invention to provide a portable, hand-held and lightweight device and method of operation for said device, for aligning two pieces of weldable material which are to be joined together by welding and for simultaneously tack welding the two pieces of weldable material together, that will dramatically decrease the time required to align and tack weld two pieces of weldable material, that will insure that said pieces of weldable material do not separate or twist during an orbital welding process, that will eliminate the need to excessively tighten the clamps on an orbital weld head, thereby reducing the occurrence of clamping marks on the weldable material, that will eliminate the need to use a feeler gauge to manually align said pieces of weldable material to each other prior to the performing of the orbital welding operation, that will mechanically align the junction of the weldable material pieces with the electrode performing the tack weld and that is a portable hand-held and lightweight device for simultaneously aligning and tack welding two pieces of weldable material that can be moved about.

DETAILED DESCRIPTION OF THE PREFERRED EMBODIMENT

Figure 1:
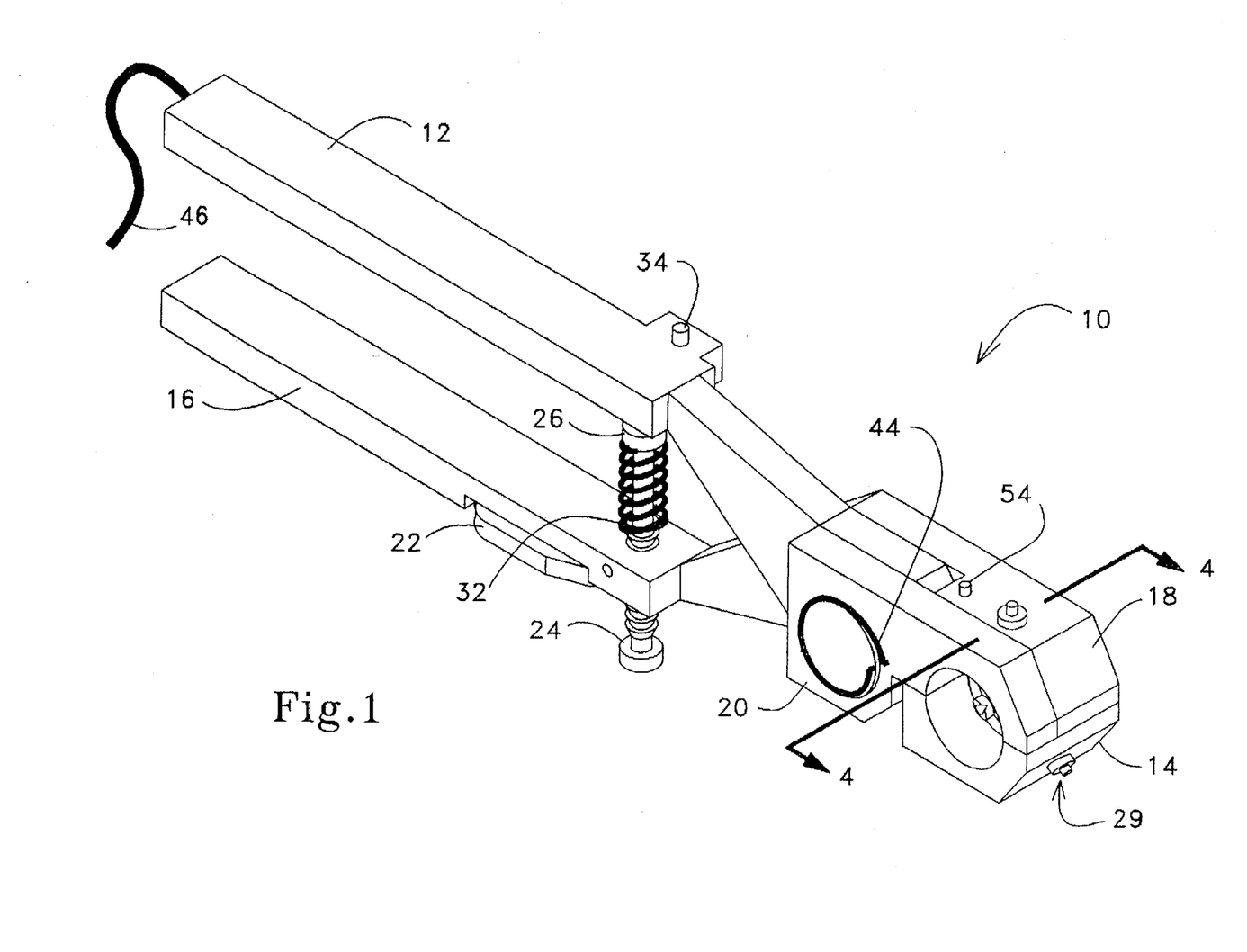
FIG. 1 is a perspective view of the alignment/welding device in the closed position.
Figure 2:
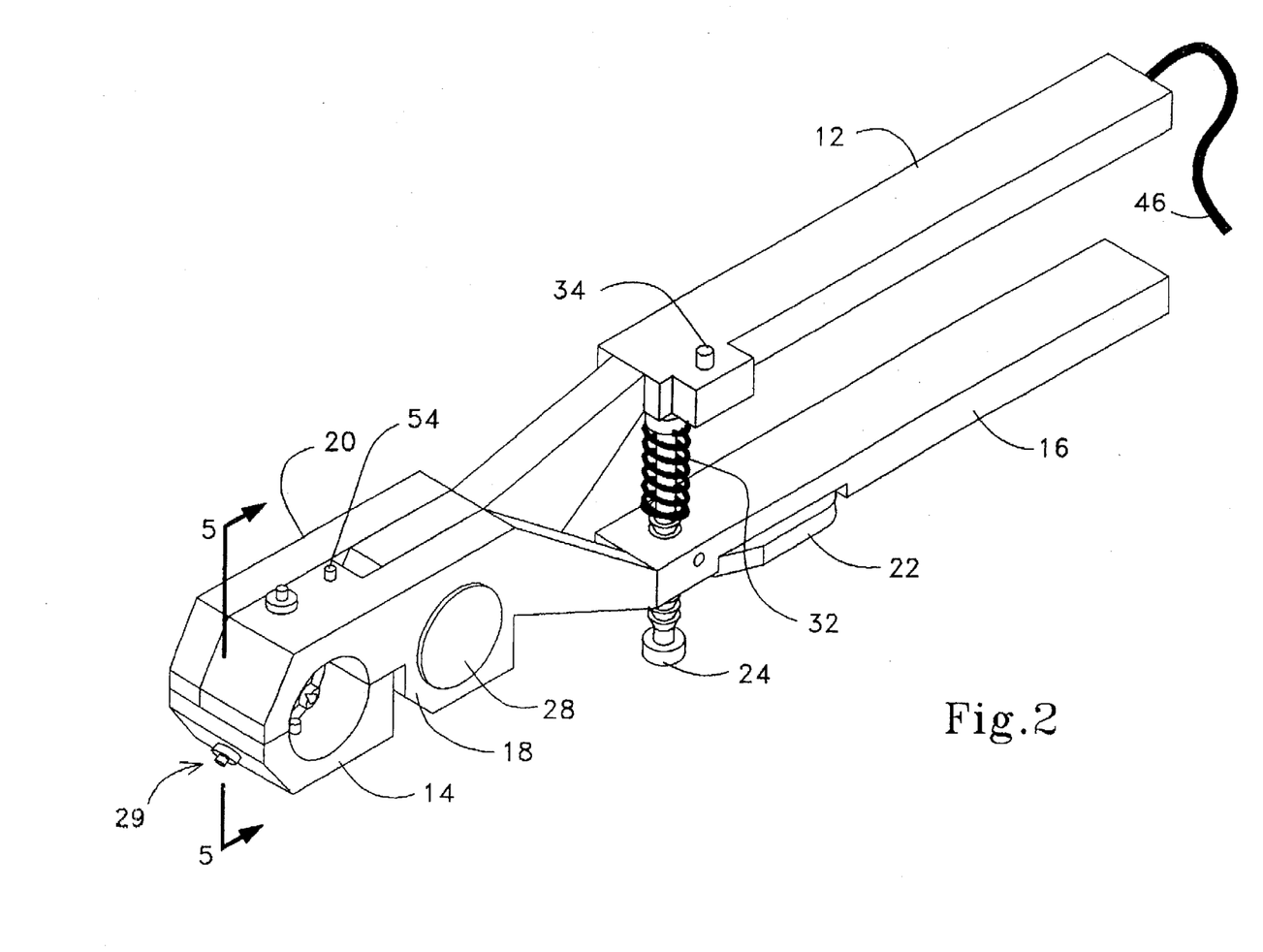
FIG. 2 is a front perspective view of the alignment/welding device in the closed position.
Figure 3:
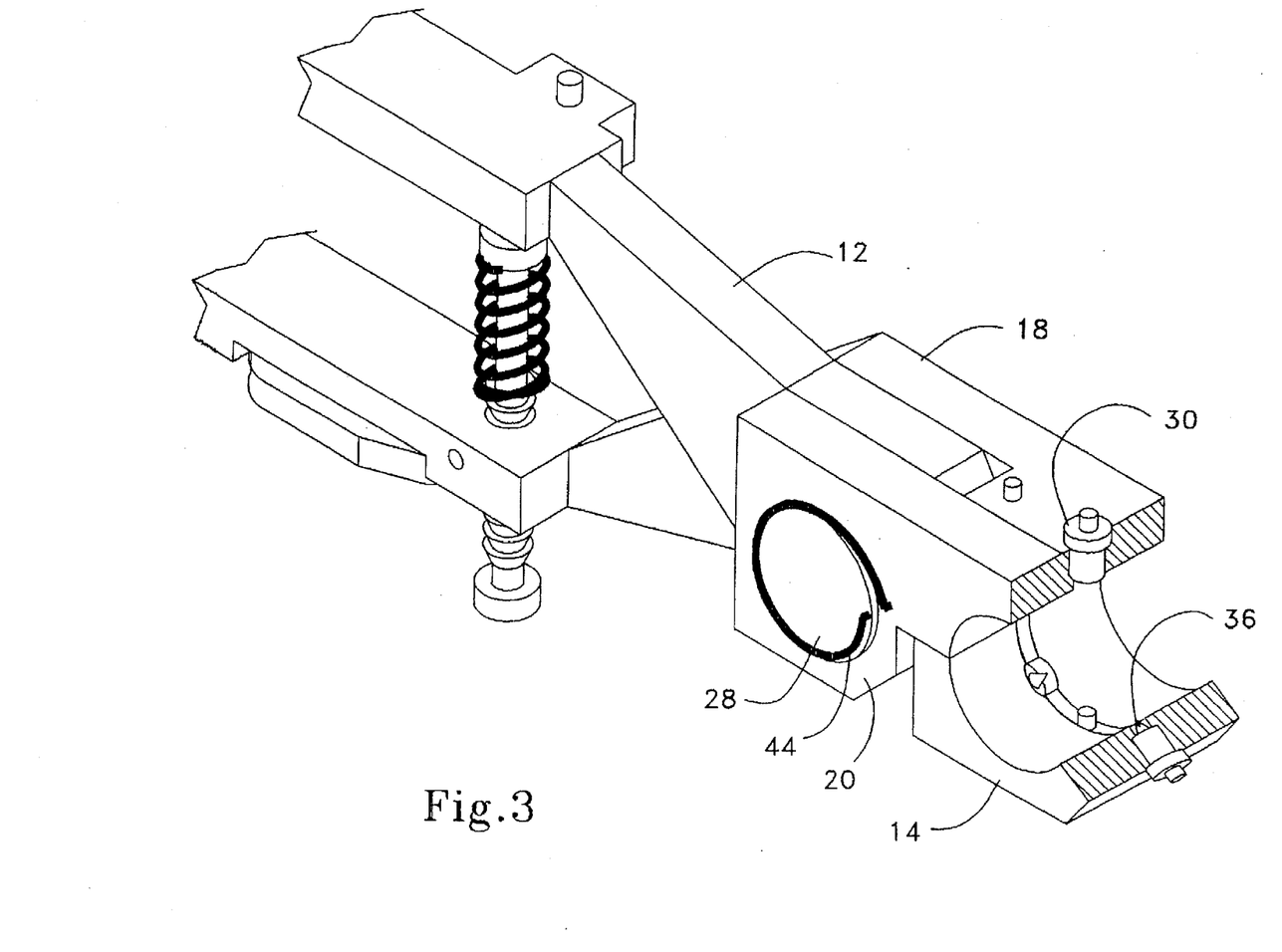
FIG. 3 is a partial cross-sectional view of the alignment/welding device in the closed position without any welding material being present.
Figure 4:
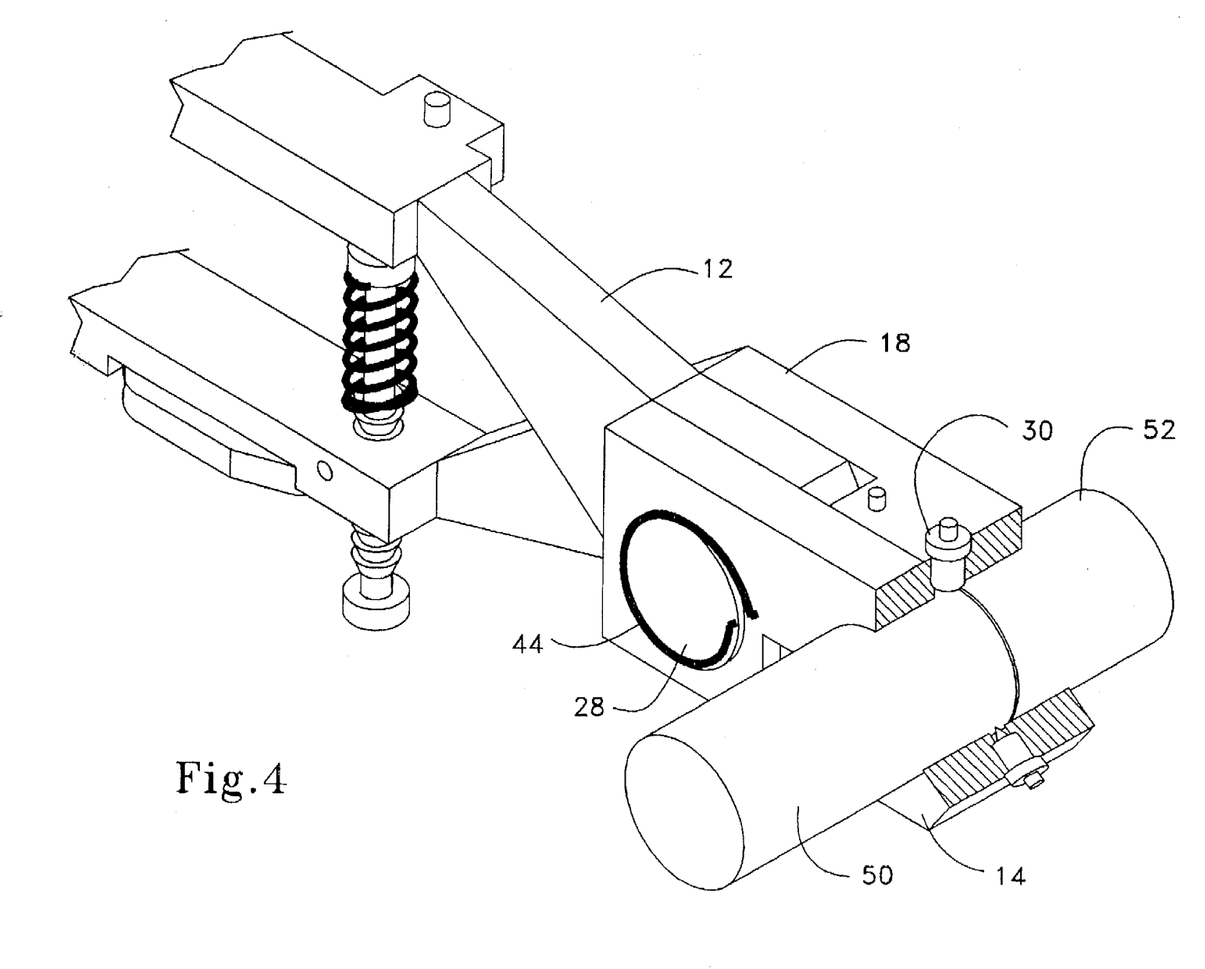
FIG. 4 is a partial cross-sectional view of the alignment/welding device in the closed position with welding material present.
Figure 9A:
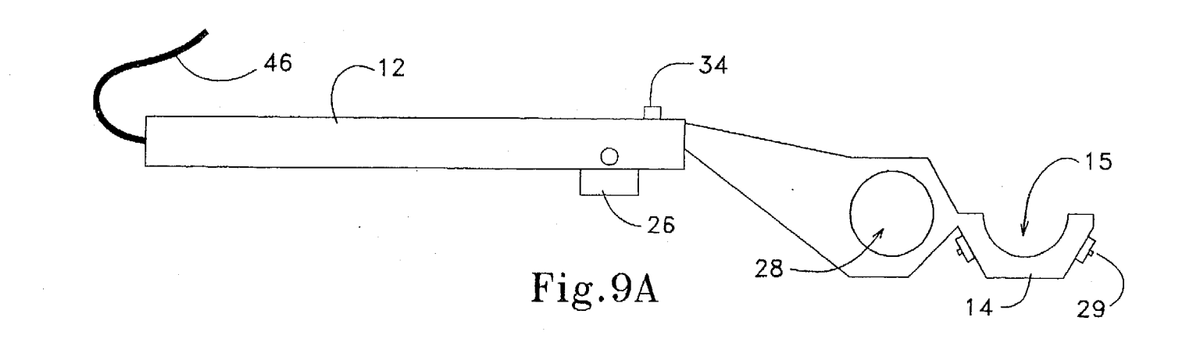
FIG. 9 is a side and top view of the first jaw of the alignment/welding device.
Figure 9B:
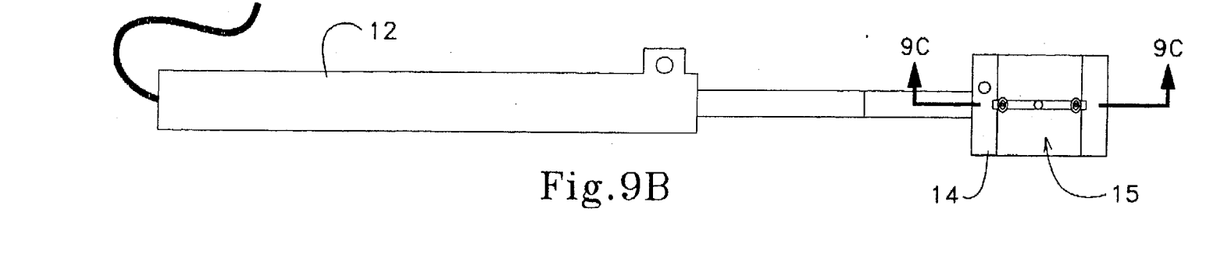
Figure 9C:
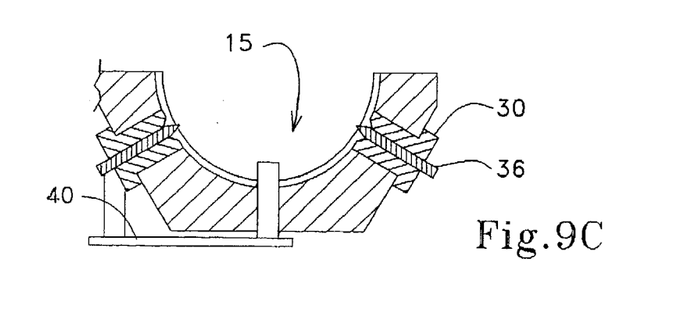

Referring to FIG. 1, alignment/welding device 10 has a first hand grip 12 which terminates in a first jaw 14, and a second hand grip 16 which terminates in a second jaw 18. The first jaw 14 has a first alignment zone 15 contained therein which is formed by a substantially semi-cylindrical gap in first jaw 14 (See FIG. 9 for detail). The second jaw 18 has a second alignment zone 19 which is formed by a substantially semi-cylindrical gap in second jaw 18 (See FIG. 10 for detail). The first hand grip 12 and second hand grip 16 are pivotally joined together in a conventional pivot fashion, as commonly found in pliers or other similar hand tools, by using a pivot pin 28 which can be implemented using a screw or other fastening means not shown in the preferred embodiment. When pivotally joined together and placed in the closed position, the first jaw 14 aligns with and abuts against the second jaw 18, in such a manner that the first alignment zone 15 and the second alignment zone 19 form a substantially cylindrical alignment conduit. The diameter of the alignment conduit is substantially equal to the diameter of the weldable material pieces 50 and 52 shown in FIG. 4.

A plurality of electrodes 29 extend through the walls of first jaw 14 and second jaw 18 into said alignment conduit. The electrodes are connected by wires 46 to a conventional welding machine (not shown), or similar power source.

Figure 8:
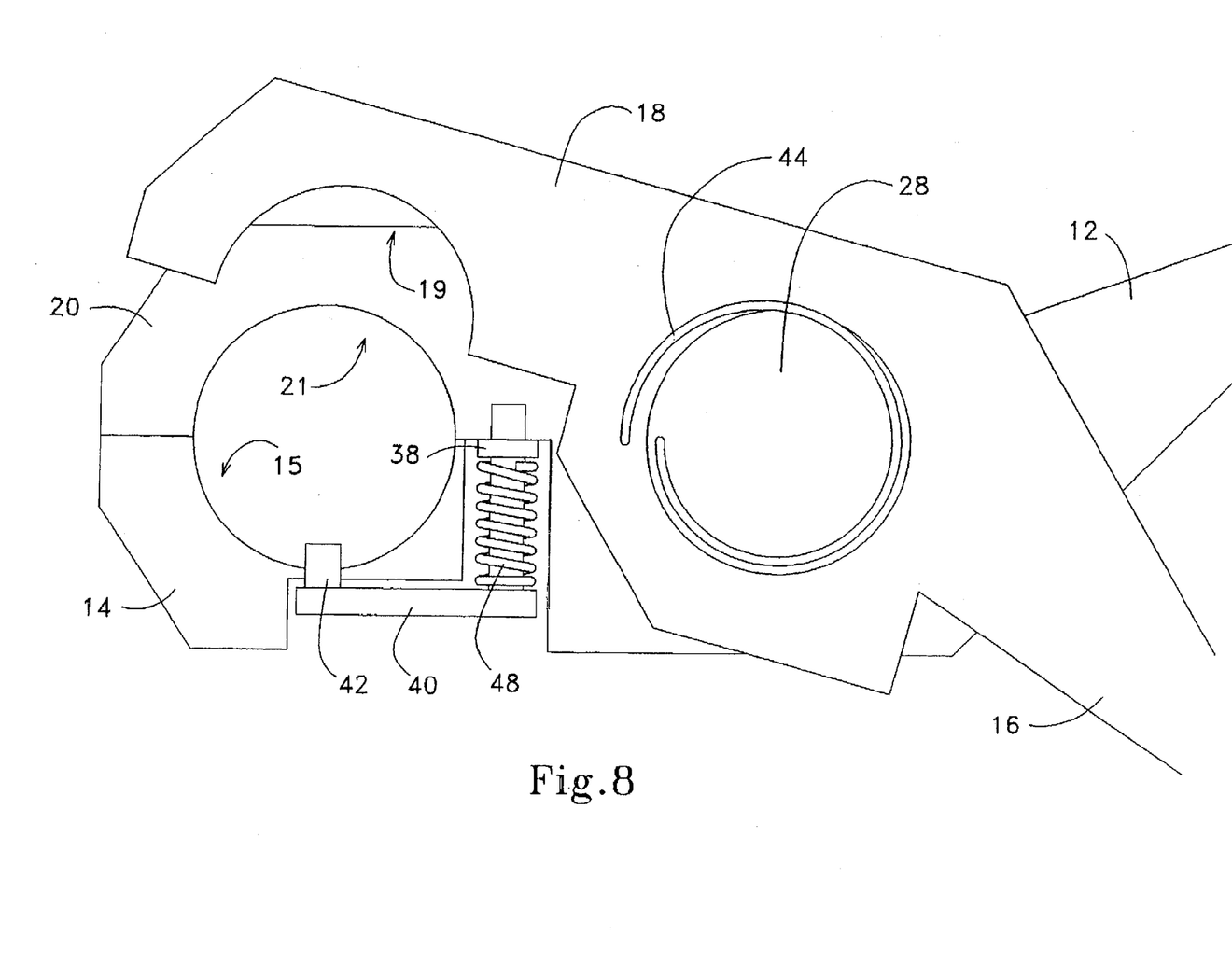
FIG. 8 is a side view of the alignment/welding device in a partially closed position.

FIG. 8 depicts pre-lock clamping jaw 20 which, like the first jaw 14 and the second jaw 18, has a semi-cylindrical alignment zone 21. Pre-lock clamping jaw 20 is mounted on pivot pin 28 alongside second jaw 18. Pre-lock clamping jaw 20 is oriented on pivot pin 28 so that its semi-cylindrical alignment zone 21 aligns with the second alignment zone 19 when the device 10 is in a closed position as shown in FIG. 1.

Figure 10A:
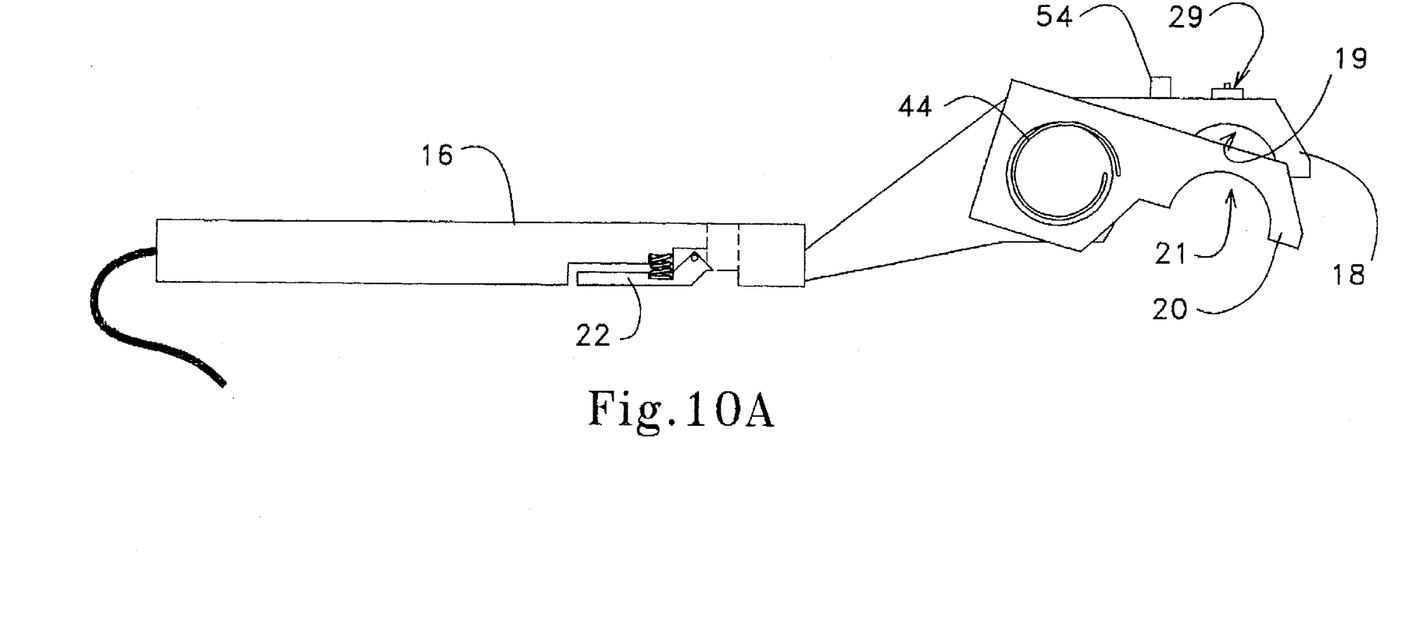
FIG. 10 is a side and top view of the second jaw of the alignment/welding device.
Figure 10B:
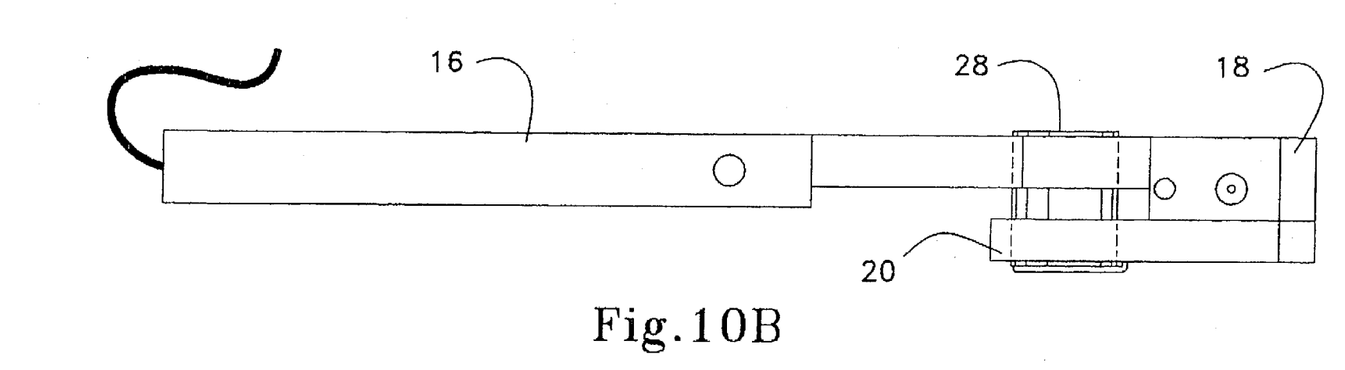
Figure 11A:
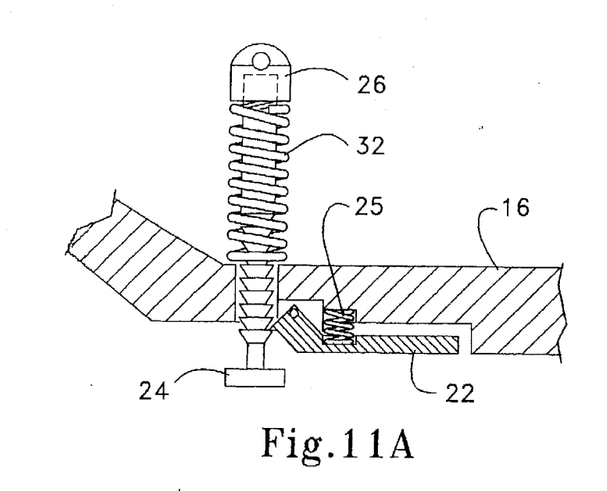
FIG. 11 is an exploded side view and bottom view of the bottom handle and of the ratcheting rod.
Figure 11B:
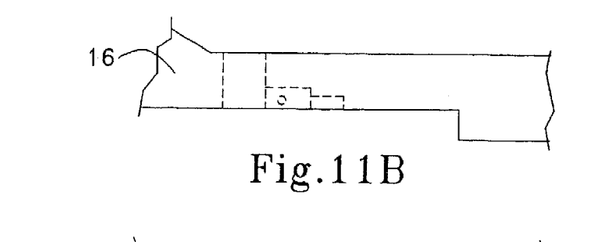
Figure 11C:
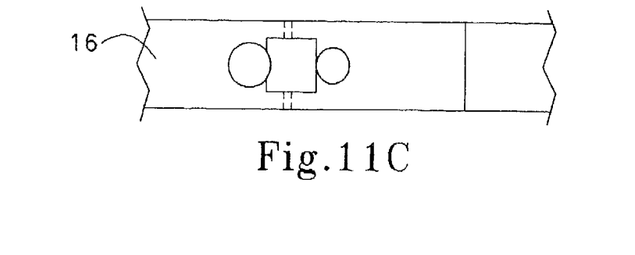
Figure 11D:
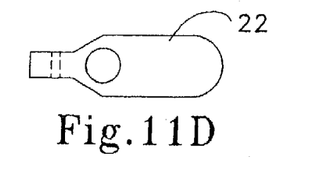
Figure 11E:
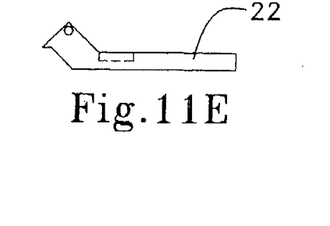
Figures 11F, 11J:
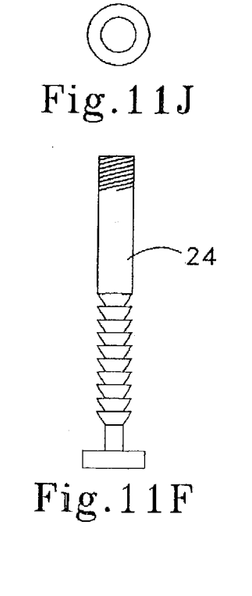
Figure 11G:
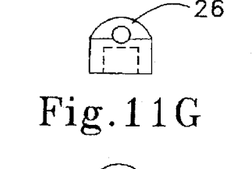
Figure 11H:
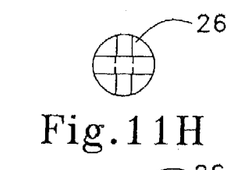

Tension coil 44 connects pre-lock clamping jaw 20 to pivot pin 28 in a manner such that, when the device 10 is open, the tension in coil 44 pivotally advances pre-lock clamping jaw 20 so that pre-lock clamping jaw 20 leads second jaw 18 as shown in FIG. 10. As the device 10 is closed by bringing hand grip 12 and hand grip 16 together, pre-lock clamping jaw 20 makes contact with first jaw 14 before second jaw 18 makes contact with first jaw 14 as shown in FIG. 8. As first hand grip 12 and second hand grip 16 are moved still closer together, the tension in coil 44 increases thereby holding pre-lock clamping jaw 20 firmly in place against first jaw 14.

Figure 12A:
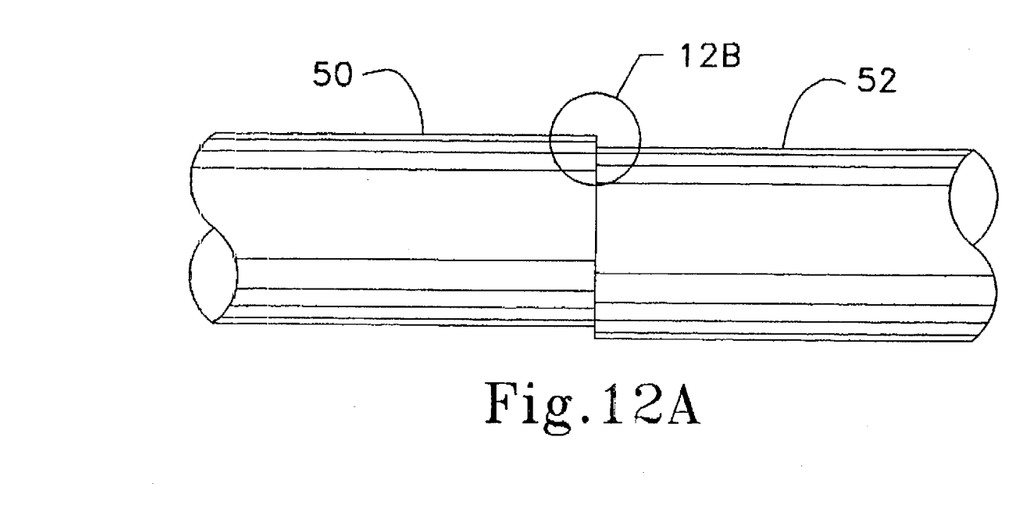
FIG. 12 is a depiction of the distance "d1" which is used to measure alignment tolerances.
Figure 12B:
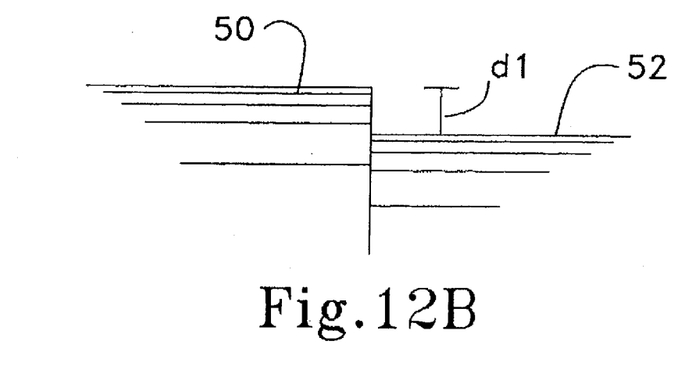

In this manner, the first weldable material piece 50 and the second weldable material piece 52 can be secured into device 10 independently. With the device 10 fully open, the technician places first weldable material piece 50 between first jaw 14 and pre-lock clamping jaw 20. As hand grip 12 and hand grip 16 are moved closer together, pre-lock clamping jaw 20 will make contact with first jaw 14 thereby securing first weldable material piece 50 in a plane of spatial orientation that is fixed relative to device 10. The technician then places second weldable material piece 52 between first jaw 14 and second jaw 18 in contact with first weldable material piece 50. By further closing device 10, second jaw 18 closes upon second weldable material piece 52 and contacts first jaw 14 thereby securing second weldable material piece 52 in the same plane of spatial orientation as first weldable material piece 50. Because the alignment conduit forms a continuous cylinder when device 10 is in the closed position, first weldable material piece 50 and second weldable material piece 52 will conform to the conduit and will thus be in strict alignment when device 10 is in the closed position. Alignment tolerances of 10% or less are achieved by device 10 where the alignment tolerance equals the distance by which the weldable material pieces deviate from perfect alignment divided by the diameter of the weldable material pieces. The distance by which the weldable material pieces deviate from perfect alignment is shown as "d1" in FIG. 12 and is measured at the largest exposed edge of first weldable material piece 50 at the junction with second weldable material piece 1.

To ensure that the first weldable material piece 50 and second weldable material piece 52 make contact directly under the electrodes 29, device 10 employs a retractable centering pin 42. Referring to FIG. 8, centering pin 42 is connected to cross member 40 which is attached to plunger 38. When device 10 is open, spring 48, which is attached to plunger 38, contracts and forces centering pin 42 to its exposed position extending into first alignment zone 15. First weldable material piece 50 can be placed against centering pin 42 and secured into position as described above. Centering pin 42 is situated with respect to the plurality of electrodes 29 such that, when first weldable material piece 50 is in contact with centering pin 42, the edge of first weldable material piece 50 is directly below the plurality of electrodes 29. As device 10 is closed further, second jaw 18 depresses plunger 38 which causes centering pin 42 to retract below the interior surface of alignment zone 15. With centering pin 42 thus retracted, second weldable material piece 52 can then be placed directly against first weldable material piece 50. In this manner, the weldable material pieces will contact each other at a point directly below electrodes 29.

Device 10 utilizes a ratcheting structure to provide means for locking first hand grip 12 and second hand grip 16 into a fixed position thus clamping first weldable material piece 50 and second weldable material piece 52 into position. Referring to FIG. 1, a ratcheting rod 24 extends through a hole in second hand grip 16, through the center of spring 32 and into adjustment mounting nut 26 which is secured to first hand grip 12. The tension in spring 32 biases hand grip 12 away from hand grip 16. Referring to FIG. 11, lock and release lever 22 is pivotally attached to second hand grip 16 and biased with spring 25. Lock and release lever 22 latches on to ratcheting rod 24 preventing hand grip 16 from moving away from hand grip 12. The tension in spring 32 prevents hand grip 16 from moving towards hand grip 12 and thus the hand grips are locked into position. When the technician depresses lock and release lever 22, it will release from ratcheting rod 24 and the tension in spring 32 will cause hand grip 12 and hand grip 16 to separate from each other.

This locking arrangement facilitates the securing of weldable material piece 50 independently from second weldable material piece 52 described above. As first hand grip 12 and second hand grip 16 are moved towards each other from a fully open position, pre-lock clamping jaw 20 will make contact with first weldable material piece 50. The tension in coil 44 will hold first weldable material piece 50 in place. As first hand grip 12 and second hand grip 16 are closed further, but before the hand grips are locked into place, centering pin 42 will be depressed by second hand grip 16 below the surface of first jaw 14. When first hand grip 12 and second hand grip 16 are moved further towards each other, but slightly before second jaw 18 makes contact with first jaw 14, the locking and ratcheting arrangement will lock first hand grip 12 and second hand grip 16 into place while allowing just enough clearance between second jaw 18 and first jaw 14 to insert second weldable material piece 52 between second jaw 18 and first jaw 14 and against first weldable material piece 50. First hand grip 12 and second hand grip 16 can now be further depressed until second weldable material piece 52 is locked into fixed position between first jaw 14 and second jaw 18.

At this point, first weldable material piece 50 and second weldable material piece 52 are in place and the abutment junction is in alignment with the electrodes 29. Furthermore, first weldable material piece 50 and second weldable material piece 52 are in alignment with each other. With first weldable material piece 50 and second weldable material piece 52 thus locked into place, device 10 is now ready for the weld process.

Figure 5:
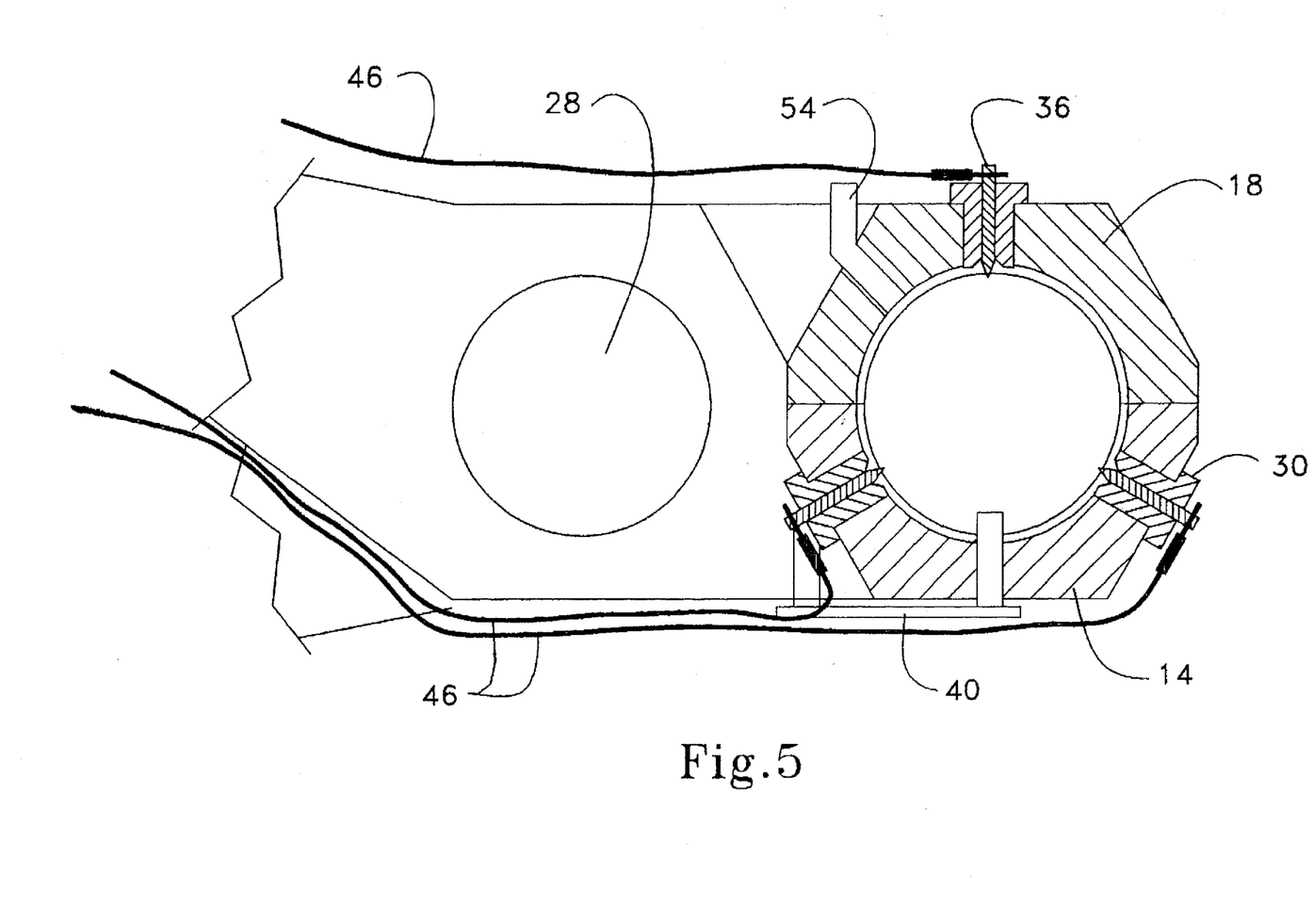
FIG. 5 is a side cross-sectional view of the front portion of the alignment/welding device having a three-electrode configuration.
Figures 6A, 6B, 6C:
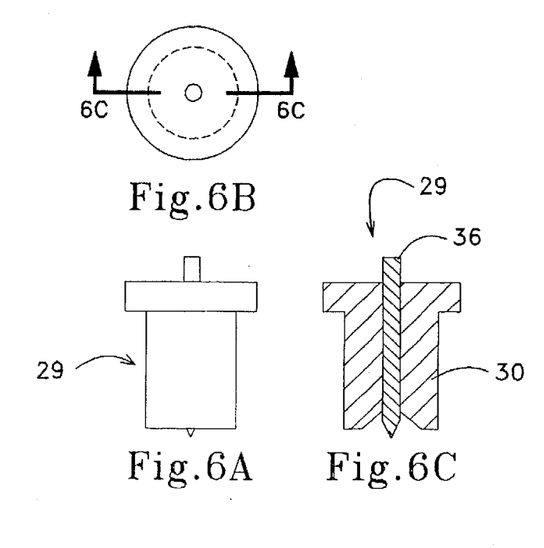
FIG. 6 is a top, side, and cross-sectional view of a standard welding electrode.
Figure 7A:
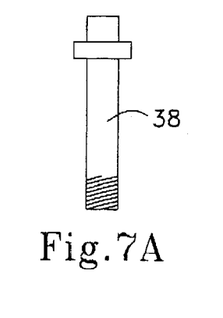
FIG. 7 is a side view of the retractable centering pin, cross member, plunger and spring, and a cross-sectional view of the cross member.
Figure 7B:
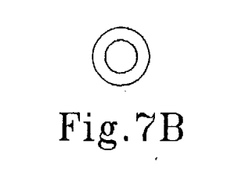
Figure 7C:
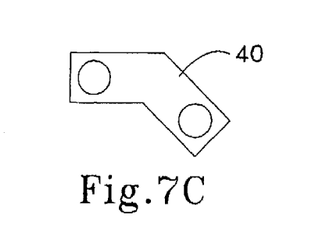
Figure 7D:
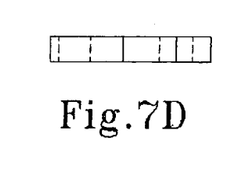
Figure 7E:
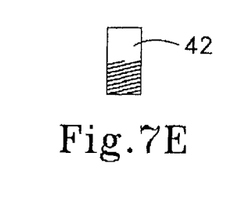
Figure 7F:
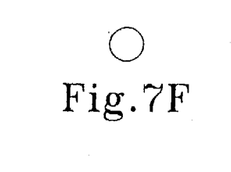
Figure 7G:
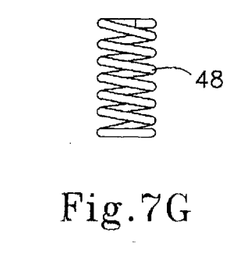
Figure 7H:
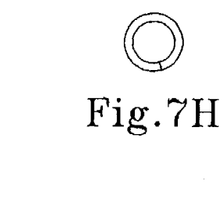

Referring to FIG. 1, argon gas from an external source (not shown) will flow into purge fitting 54 via an external hose (not shown). The weld process is then initiated by depressing switch 34. Referring to FIG. 5, the external welder (not shown) will supply an electric charge via wires 46 which will cause electrodes 29 to arc to the weldable material pieces producing a small spot weld between first weldable material piece 50 and second weldable material piece 52 at each electrode 29. A welder common to the art of welding can be used for this application. Referring to FIG. 6, each electrode 29 is comprised of ceramic insulator 30 and a conductor 36 made from tungsten or other suitable material.

After the tack weld process is over, the technician depresses first hand grip 12 and second hand grip 16 while depressing the lock and release lever 22. First hand grip 12 will spring away from second hand grip 16 because of the tension in spring 32 and the fused weldable material piece can be removed.

What is claimed is:

1. A portable apparatus for precision alignment and tack welding of a first piece of weldable material to a second piece of weldable material, comprising:

a first jaw, having a first end, a second end, and a first alignment zone having an inside surface that defines an alignment gap;

a second jaw, having a first end, a second end, and a second alignment zone having an inside surface that defines a second alignment gap; said second jaw being pivotally attached to said first jaw and being oriented to said first jaw in such a manner that said inside surface of said first alignment zone and said inside surface of said second alignment zone cooperatively define a first alignment conduit that is sized and shaped to receive said first terminus of said first piece of weldable material and said first terminus of said second piece of weldable material when said first end of said first jaw is at a first separation distance from said first end of said second jaw and is further sized and shaped to snugly encircle and firmly secure said first end of said first piece of weldable material and said first end of said second piece of weldable material when said first end of said first jaw is at a second, closer separation distance from said first end of said second jaw;

pre-lock clamping means pivotally attached to said first jaw and sized and shaped for firmly holding said first terminus of said first piece of weldable material when said first terminus of said first piece of weldable material is fully inserted in said first alignment conduit and when said first end of said first jaw is at a third separation distance from said first end of said second jaw, which third separation distance is an intermediate distance between said first separation distance and said second separation distance; and tack welding means for applying a plurality of tack welds to said abutment junction in such a manner as to temporarily join together said first terminus of said second piece of weldable material and said first terminus of said first piece of weldable material, when said first terminus of said second piece of weldable material and said first terminus of said first piece of weldable material are fully inserted into said first alignment conduit.

2. The portable apparatus of claim 1 wherein said first terminus of said first piece of weldable material and said first terminus of said second piece of weldable material to be inserted in said precision alignment device are substantially cylindrically tubular; wherein the outside diameter of said first terminus of said first piece of weldable material is substantially equal to the outside diameter of said first terminus of said second piece of weldable material; and wherein the alignment tolerance at said abutment junction is less than or equal to 10%.

3. The portable apparatus of claim 2 wherein said welding means comprises a plurality of electrodes that extend into said alignment conduit.

4. The apparatus of claim 3 wherein said pre-lock clamping means comprises:

a pre-lock clamping jaw having a first end, a second end and a third alignment zone having an inner surface that defines a third alignment gap, said third alignment gap being of substantially the same dimensions as said second alignment gap; said pre-lock clamping jaw being oriented to said first jaw in such a manner that said inside surface of said third alignment zone and said inside surface of said first alignment zone cooperatively define a second alignment conduit that is at least partially contiguous with said first alignment conduit and that is sized and shaped to snugly encircle and firmly secure said first terminus of said first piece of weldable material when said first end of said first jaw is at said third separation distance from said first end of said second jaw.

5. The apparatus of claim 4 wherein said first end of said first jaw comprises a first hand grip and said first end of said second jaw comprises a second hand grip.

6. The apparatus of claim 5 further comprising ratcheting means attached to said first jaw and said second jaw, for ratchetably moving said first hand grip towards said second hand grip when said first hand grip and said second hand grip are squeezed together.

7. The apparatus of claim 6 further comprising centering means for placing said abutment junction in close proximity to said electrodes.

8. The apparatus of claim 7 wherein said centering means comprises a centering pin retractably mounted to said first jaw and extending into said alignment conduit, said centering pin being positioned to blockingly engage said first terminus of said first piece of weldable material when said first end of said first jaw is at said first separation distance from said first end of said second jaw and said terminus of said first piece of weldable material is in close proximity to said plurality of electrodes; said centering pin further being positioned to retract when said first end of said first jaw is at said third separation distance from said first end of said second jaw.

9. A method of simultaneously aligning and tack welding two pieces of weldable material comprising the steps of:

selecting two pieces of weldable material;

selecting an appropriate alignment/welding device wherein in said device comprises:

a first jaw, having a first end, a second end, and a first alignment zone having an inside surface that defines an alignment gap;

a second jaw, having a first end, a second end, and a second alignment zone having an inside surface that defines a second alignment gap; said second jaw being pivotally attached to said first jaw and being oriented to said first jaw in such a manner that said inside surface of said first alignment zone and said inside surface of said second alignment zone cooperatively define a first alignment conduit that is sized and shaped to receive said first terminus of said first piece of weldable material and said first terminus of said second piece of weldable material when said first end of said first jaw is at a first separation distance from said first end of said second jaw and is further sized and shaped to snugly encircle and firmly secure said first end of said first piece of weldable material and said first end of said second piece of weldable material when said first end of said first jaw is at a second, closer separation distance from said first end of said second jaw; and pre-lock clamping means pivotally attached to said first jaw and sized and shaped for firmly holding said first terminus of said first piece of weldable material when said first terminus of said first piece of weldable material is fully inserted in said first alignment conduit and when said first end of said first jaw is at a third separation distance from said first end of said second jaw, which third separation distance is an intermediate distance between said first separation distance and said second separation distance;

tack welding means for applying a plurality of tack welds to said abutment junction in such a manner as to temporarily join together said first terminus of said second piece of weldable material and said first terminus of said first piece of weldable material, when said first terminus of said second piece of weldable material and said first terminus of said first piece of weldable material are fully inserted into said first alignment conduit; and a welding machine electrically connected to said electrodes; placing said pieces of weldable material into said alignment/welding device; and tack welding said pieces of weldable material by supplying said electrodes with a voltage from said welding machine.

10. The method of claim 9 wherein said first terminus of said first piece of weldable material and said first terminus of said second piece of weldable material to be inserted in said precision alignment device are substantially cylindrically tubular; wherein the outside diameter of said first terminus of said first piece of weldable material is substantially equal to the outside diameter of said first terminus of said second piece of weldable material; and wherein the alignment tolerance at said abutment junction is less than or equal to 10%.

11. The method of claim 10 wherein said welding means of said high precision alignment device comprises a plurality of electrodes that extend into said alignment conduit.

12. The method of claim 11 wherein said pre-lock clamping means of said high precision alignment device comprises:

a pre-lock clamping jaw having a first end, a second end and a third alignment zone having an inner surface that defines a third alignment gap, said third alignment gap being of substantially the same dimensions as said second alignment gap; said pre-lock clamping jaw being oriented to said first jaw in such a manner that said inside surface of said third alignment zone and said inside surface of said first alignment zone cooperatively define a second alignment conduit that is at least partially contiguous with said first alignment conduit and that is sized and shaped to snugly encircle and firmly secure said first terminus of said first piece of weldable material when said first end of said first jaw is at said third separation distance from said first end of said second jaw.

13. The method of claim 12 wherein said high precision alignment device further comprises first end of said first jaw comprises a first hand grip and said first end of said second jaw comprises a second hand grip.

14. The method of claim 13 further, wherein said high precision alignment device further comprises ratcheting means attached to said first jaw and said second jaw, for ratchetably moving said first hand grip towards said second hand grip when said first hand grip and said second hand grip are squeezed together.

15. The method of claim 14 further, wherein said high precision alignment device further comprises centering means for placing said abutment junction in close proximity to said electrodes.

16. The method of claim 15 wherein said centering means of said high precision alignment device further comprises a centering pin retractably mounted to said first jaw and extending into said alignment conduit, said centering pin being positioned to blockingly engage said first terminus of said first piece of weldable material when said first end of said first jaw is at said first separation distance from said first end of said second jaw and said terminus of said first piece of weldable material is in close proximity to said plurality of electrodes; said centering pin further being positioned to retract when said first end of said first jaw is at said third separation distance from said first end of said second jaw.

* * * * *